United States Patent [19]
Bates et al.

[11] Patent Number: 6,077,312
[45] Date of Patent: Jun. 20, 2000

[54] APPARATUS, PROGRAM PRODUCT AND METHOD OF DEBUGGING UTILIZING A CONTEXT SENSITIVE BREAKPOINT

[75] Inventors: Cary Lee Bates; Paul Reuben Day, both of Rochester, Minn.

[73] Assignee: International Business Machines Corporation, Armonk, N.Y.

[21] Appl. No.: 09/073,742

[22] Filed: May 6, 1998

[51] Int. Cl.[7] .................................................. G06F 9/445
[52] U.S. Cl. ........................... 717/4; 717/1; 717/2; 717/3; 717/5; 717/6; 717/7; 717/8; 717/9; 717/10; 717/11
[58] Field of Search .................................... 395/701, 702, 395/703, 704, 705, 706; 717/1, 2, 3, 4, 5, 6, 7, 8, 9, 10, 11

[56] References Cited

U.S. PATENT DOCUMENTS

| | | | |
|---|---|---|---|
| 5,375,125 | 12/1994 | Oshima et al. | 714/38 |
| 5,446,900 | 8/1995 | Kimelman | 395/704 |
| 5,652,835 | 7/1997 | Miller | 714/38 |
| 5,845,125 | 12/1998 | Nishimura et al. | 395/704 |
| 5,860,009 | 1/1999 | Uchihira et al. | 395/706 |
| 5,862,379 | 7/1999 | Rubin et al. | 395/702 |
| 5,910,895 | 6/1999 | Proskauer et al. | 364/468.28 |
| 5,926,176 | 7/1999 | McMillan et al. | 345/339 |
| 5,953,735 | 9/1999 | Forcier | 707/541 |
| 5,970,248 | 10/1999 | Meier | 395/704 |
| 6,021,488 | 2/2000 | Eisen et al. | 712/228 |

OTHER PUBLICATIONS

Miller et al., "Breakpoints and Halting in Distributed Programs", IEEE, pp. 316–323, 1988.

Frumkin et al., "Trace–Driven Debugging of Message Passing Programs", IEEE, pp. 753–762, 1998.

Manabe et al., "Debugging Dynamic Distributed Programs Using Global Predicates", IEEE, 402–407, 1992.

IBM Technical Disclosure Bulletin, "Program Debugging in an Incompletely Assembled Runtime Environment", vol. 40, No. 5, pp. 111–114, May 1997.

Hand, "Debugging Embedded Systems Implemented in C", ACM, pp. 17–22, May 1997.

*Primary Examiner*—Tariq R. Hafiz
*Assistant Examiner*—Ted T. Vo
*Attorney, Agent, or Firm*—Wood, Herron and Evans, L.L.P.; Steven W. Roth

[57] ABSTRACT

An apparatus, program product, and method of debugging a computer program utilize a context sensitive breakpoint to conditionally halt execution of a computer program when the context of the computer program meets a predetermined criteria. The context of a computer program is defined by a calling history associated with the computer program that identifies, at any given instant during the execution of the computer program, the sequence of routines in the computer program that were called prior to reaching the instruction being processed at that given instant. By basing the determination of whether to interrupt processing of a computer program upon the calling history for the computer program, a computer programmer is given a great deal of flexibility in setting breakpoints that isolate the circumstances for which it is desired to induce stoppage of a computer program from other unwanted circumstances.

27 Claims, 6 Drawing Sheets

APPARATUS, PROGRAM PRODUCT AND METHOD OF DEBUGGING UTILIZING A CONTEXT SENSITIVE BREAKPOINT

FIELD OF THE INVENTION

The invention is generally related to computers and computer software. More specifically, the invention is generally related to the use of breakpoints in debugging computer software applications and the like.

BACKGROUND OF THE INVENTION

An important aspect of the design and development of a computer program is a process known as "debugging". Simply stated, debugging is performed by a computer programmer to locate and identify errors in a program under development. Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one, and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, a second operation supported by conventional debuggers is a breakpoint operation, which permits a computer programmer to identify with a "breakpoint" a precise instruction for which it is desired to halt execution of a computer program during execution. As a result, when a computer program is executed by a debugger, the program executes in a normal fashion until a breakpoint is reached, and then stops execution and displays the results of the computer program to the programmer for analysis.

Typically, step operations and breakpoints are used together to simplify the debugging process. Specifically, a common debugging operation is to set a breakpoint at the beginning of a desired set of instructions to be analyzed, and then begin execute the program. Once the breakpoint is reached, the program is halted, and the programmer then steps through the desired set of instructions line-by-line using the step operation. Consequently, a programmer is able to quickly isolate and analyze a particular set of instructions without having to step through irrelevant portions of a computer program.

Most breakpoints supported by conventional debuggers are unconditional, meaning that once such a breakpoint is reached, execution of the program is always halted. Some debuggers also support the use of conditional breakpoints, which only halt execution of a program when a variable used by the program is set to a predetermined value at the time such a breakpoint is reached.

One significant drawback to conventional breakpoints results from the fact that some instructions in a computer program are executed fairly often for different purposes, and may result in many needless stoppages before a desired stoppage is encountered. This problem is especially pronounced in object-oriented programming (OOP) and other highly modular languages, where a single general purpose portion of a computer program may be executed in a number of different situations for different purposes.

With an object-oriented programming language, for example, a program is constructed from a number of "objects", each of which includes data and/or one or more sets of instructions (often referred to as "routines" or "methods") that define specific operations that can be performed on the data. A large number of objects may be used to build a computer program, with each object interacting with other objects in the computer program to perform desired operations. When one object invokes a particular routine in another object, the former object is often said to be "calling" the routine in the latter object.

Some general purpose objects in a computer program may support basic operations, e.g., displaying information to a user, printing information on a printer, storing or retrieving information from a database, etc. These types of objects, in particular, may have routines that are called by many different objects, and thus placing a conventional breakpoint in a routine of such an object may result in hundreds of unwanted stoppages prior to occurrence of a desired stoppage.

A computer programmer may be able to alleviate this problem to an extent by locating the specific calls in other objects that relate to the desired stoppage in a particular object, and setting breakpoints at each of these specific calls. Locating each relevant call and setting a breakpoint can be extremely time consuming and tedious, however, there is a risk that not all relevant calls are located, so not all desired circumstances for inducing stoppages may be recognized during debugging.

Therefore, a significant need continues to exist for an improved manner of debugging computer programs, specifically in the area of breakpoints, to simplify and facilitate the debugging process for computer programmers.

SUMMARY OF THE INVENTION

The invention addresses these and other problems associated with the prior art by providing an apparatus, program product, and method of debugging a computer program that utilize a context sensitive breakpoint to conditionally halt execution of a computer program when the context of the computer program meets a predetermined criteria. The context of a computer program is defined by a calling history associated with the computer program that identifies, at any given instant during the execution of the computer program, the sequence of routines in the computer program that were called prior to reaching the instruction being processed at that given instant.

A predetermined criteria for a context sensitive breakpoint can take a number of forms, including without limitation, one or more of the presence or absence of routines in a calling history, the presence or absence of a specific ordering of routines in a calling history, and the length of a calling history, among others. The predetermined criteria may also optionally specify particular instructions from which routine calls were made in the routines in a calling history. Other predetermined criteria for a context sensitive breakpoint may be used consistent with the invention.

As an example, assume that to reach an instruction I in a computer program, a routine A called a routine B, which in turn called routine C in which instruction I was found. The calling history for the computer program when instruction I was reached would then reflect that routine C was called by routine B, which was called by routine A. If a predetermined criteria for a context sensitive breakpoint associated with instruction I specified that execution should be interrupted only if instruction I was executed after routine C was called by routine B, and after routine B was called by routine A, then the computer program would be halted when instruction I was reached. However, if instruction I was reached as a result of routine C being called by a routine D, for example, then the context sensitive breakpoint would be ignored.

By basing the determination of whether to interrupt processing of a computer program upon the calling history for the computer program, a computer programmer is given a great deal of flexibility in setting breakpoints that isolate the circumstances for which it is desired to induce stoppage of a computer program from other unwanted circumstances. The amount of effort required to establish a useful breakpoint is typically diminished, and undesirable program stoppages during debugging are typically minimized.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Hardware and Software Environment

Figure 1:
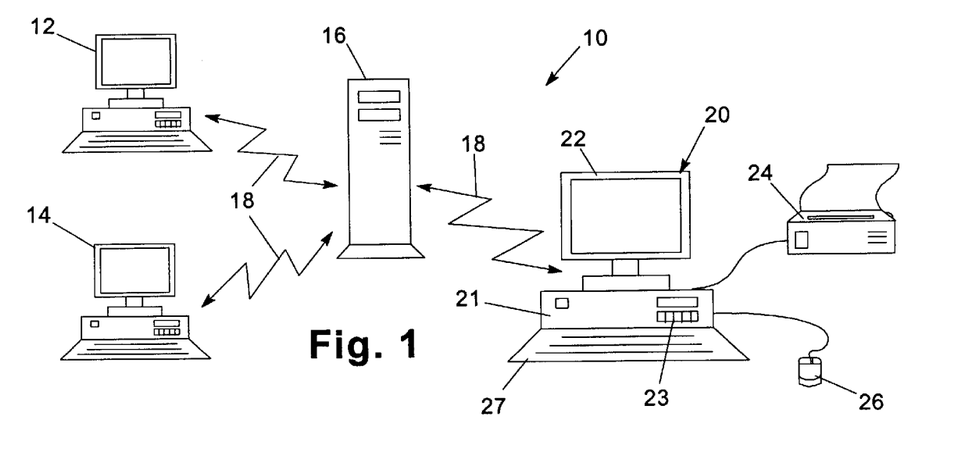
FIG. 1 is a block diagram of a networked computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
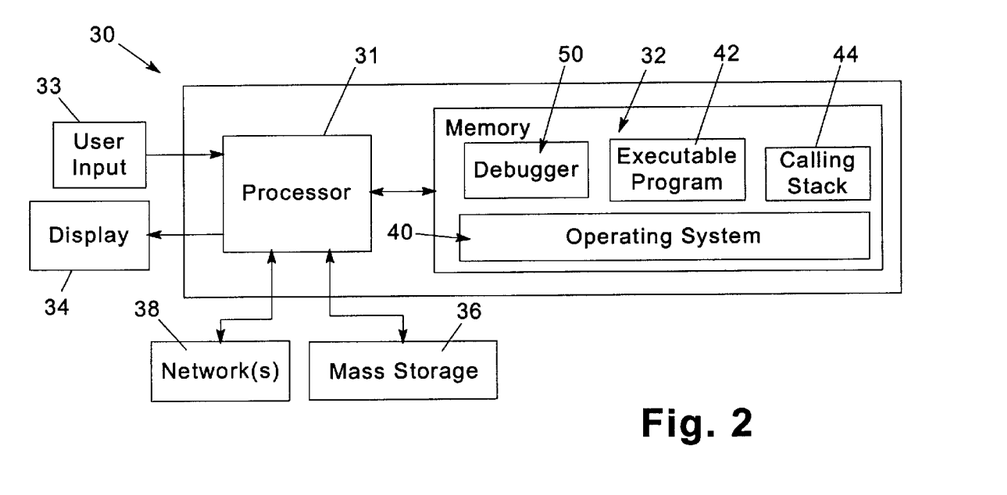
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes various computer software applications, components, programs, objects, modules, etc. (e.g., executable program 42, calling stack 44 and debugger 50, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Debugging with Context Sensitive Breakpoints

Various embodiments of the invention facilitate debugging through the use of context sensitive breakpoints that conditionally halt execution of a program being debugged based upon whether a calling history for the computer program matches a predetermined criteria.

The calling history for a computer program is typically maintained by an operating system using a data structure, such as a calling stack that maintains information regarding the sequence of routines that are called during the execution of the computer program. Routines, which are often referred to as methods, procedures, and functions, are typically sequences of instructions or statements in a computer program that may be invoked to perform predetermined operations on a computer.

As is well known in the art, a calling stack is a first in-first out (FIFO) data structure. In response to a routine call from a first routine to a second routine, an operating system will generally "push" onto the top of the calling stack an entry that identifies both the first routine, as well as the specific instruction or statement in that routine from which the routine call was made (or alternatively, the instruction or statement in that routine to which control should be returned upon completion of the second routine).

The second routine is then executed, and if that routine calls an additional routine, an entry relating to that routine call is also added to the stack. As routines terminate in execution, entries from the calling stack are then "popped" from the top of the stack and the information therein analyzed to determine the routine and instruction therein where control should be returned.

Consistent with the invention, a predetermined criteria is associated with a context sensitive breakpoint such that, upon reaching the breakpoint during execution of the computer program under debug, a test may be performed with regard to the current status of the calling stack to determine whether the calling stack matches the predetermined criteria, and thus, whether the breakpoint should be processed or ignored. A predetermined criteria can take any number of forms, including the presence or absence of specific routines in the calling stack, the presence or absence of a specific ordering of routines in the calling stack, and the length of the calling stack, among others. In addition, an "exact" match may be defined for one or more routines whereby the predetermined criteria also compares the specific instructions in such routines from which routine calls are made. Other alternative tests for use in a predetermined criteria will become more apparent below.

A predetermined criteria, for example, may be considered to include one or more calling routines that may be identified in an entry in the calling stack. For each such calling routine, an "exact" match may be specified by also associating therewith an identifier of a particular statement in the calling routine. In addition, for each such calling routine, a specific location of an entry identifying the calling routine in the calling stack may also be associated therewith. Furthermore, it may be desirable to utilize wildcards with the routine and/or location specified in an entry so that a subset of routines and/or locations may be specified. By selectively associating statement identifiers and/or locations with calling routines identified in a predetermined criteria, a great deal of flexibility is provided for conditioning the triggering of context sensitive breakpoints, and as a result, a programmer is often able to precisely tailor a breakpoint so that it is triggered only in specific, desirable circumstances.

As shown in FIG. 2, a debugger software application 50 is resident in memory 32 for the purpose of debugging one or more executable computer programs, e.g., executable program 42. A calling stack 44 associated with executable program 42 is utilized by operating system 40 during the execution of program 42.

To implement context sensitive breakpoints consistent with the invention, both a manner of setting and maintaining the breakpoints, and a manner of processing such breakpoints during execution of a computer program under debug, are required. Each of these operations are discussed in greater detail below.

Setting and Maintenance of Context Sensitive Breakpoints

Figure 3:
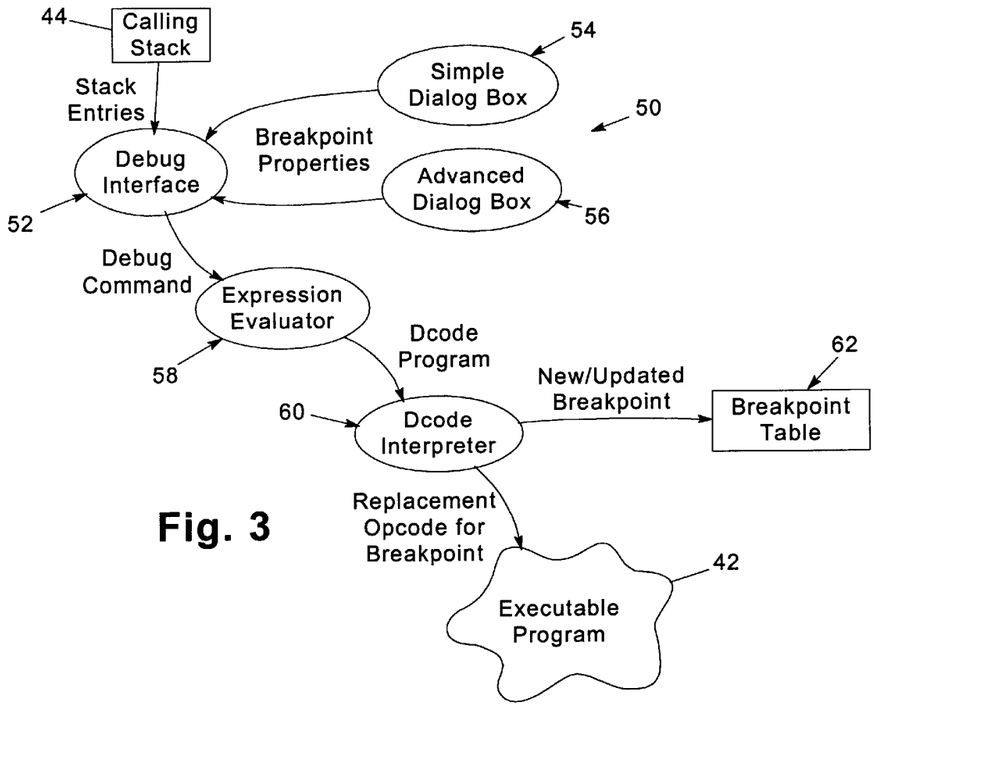
FIG. 3 is a block diagram of various debugger modules utilized by the debugger computer program of FIG. 2 in setting a context sensitive breakpoint consistent with the invention.

FIG. 3 illustrates the primary software components utilized in debugger software application 50 when setting or modifying a context sensitive breakpoint in a manner consistent with the invention. Much of the organization of debugger 50 is similar in many respects to the organization of the handling mechanisms for conventional breakpoints in conventional debuggers.

Debugger 50 includes a debugger interface module 52 through which the interface with a programmer is principally performed. It is in this module that information such as a listing of the source code of the program, as well as the contents of the calling stack 44 and other variables associated with a program during its execution, are presented to a programmer. Module 52 also receives breakpoint properties from one of two dialog boxes 54, 56 through which a user configures the properties for setting or modifying a context sensitive breakpoint.

Module 52 is also configured to receive stack entries from calling stack 44, and based upon those entries and the properties selected by a programmer, to generate a debug command for use by an expression evaluator module 58 in setting or modifying a breakpoint. The debug command specifies the properties of the breakpoint to be utilized by the debugger during debugging of a program.

The expression evaluator module 58 takes the debug command and generates therefrom a Dcode program, which is an assembly-type program executed by a Dcode interpreter module 60 to set and/or process a context sensitive breakpoint in a manner described in greater detail below. Dcode interpreter module 60, upon receipt of the Dcode program, generates a new context sensitive breakpoint or updates an existing context sensitive breakpoint, stored in a breakpoint table 62. In addition, Dcode interpreter module 60 also passes a replacement opcode for the context sensitive breakpoint to the executable program 42 to trigger processing of the breakpoint when the replacement opcode is reached during execution of program 42. As is well known in the art, a breakpoint may be detected during execution of a program by placing a known invalid instruction in the program at a desired point so that an error results when the program reaches that instruction and causes an interrupt that is then processed by the debugger.

It should be appreciated that the use of a debug interface module, an expression evaluator module, and a Dcode interpreter module is well known in the debugging art. Moreover, it should be appreciated that other configurations of software modules may be utilized in a debugger consistent with the invention. Therefore, the invention should not be limited to the particular arrangement of modules implementing debugger 50 in the implementation described in detail herein.

Figure 4:
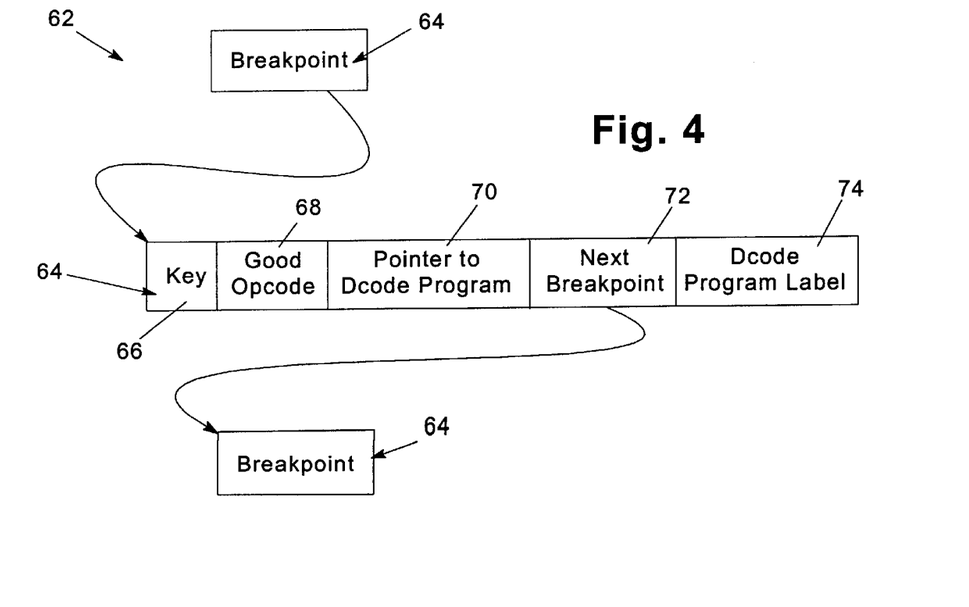
FIG. 4 is a block diagram of the breakpoint table of FIG. 3.

One suitable data structure for breakpoint table 62 is illustrated in greater detail in FIG. 4. Breakpoint table 62 includes a plurality of breakpoints 64 arranged in a linked-list data structure. Each breakpoint data structure 64 includes a key field 66, a good opcode field 68, a field 70 storing a pointer to a Dcode program, a next breakpoint field 72, and a Dcode program label field 74.

Key field 66 stores an identifier utilized in locating a specific breakpoint in data structure 62 that corresponds to a particular instruction in program 42. It should be appreciated that any number of manners of identifying a predetermined point in a program may be utilized for a breakpoint, e.g., statement number, instruction number, line number, address, etc. For key field 66 of FIG. 4, for example, the key is the address of the replacement opcode in executable program 42, whereby the breakpoint matching a given interruption of the executable program may be located by comparing the contents of the program counter as of the time that a breakpoint is reached with each of the keys stored in the various breakpoints 64 in data structure 62. Other keys may also be utilized to distinguish different breakpoints, e.g., the specific opcode in the program that has been replaced by a breakpoint opcode in the program, among others.

Good opcode field 68 in breakpoint 64 specifies the opcode that was formerly stored at the address corresponding to the breakpoint. The good opcode is replaced in the program with a replacement opcode that typically triggers an exception or error during execution of the computer program so that the debugger may be called to handle the breakpoint accordingly. Then, after the breakpoint is processed and execution of the program is continued, the good opcode is then simulated by the Dcode interpreter module 60 such that accurate processing of the program is performed.

Breakpoint 64 also includes a pointer to a Dcode program, stored in field 70. The Dcode program, as discussed above, includes program code that is executed by Dcode interpreter module 60 for use in setting, updating, and/or processing a context sensitive breakpoint. Rather than a pointer to the program, the actual program code for the Dcode program may be stored within breakpoint 64. In addition, it should be appreciated that if data structure 62 supports unconditional breakpoints, the pointer may be set to NULL to indicate that no Dcode program is associated with the breakpoint. It should also be appreciated that, to handle other types of conditional breakpoints, pointer 70 may also point to dedicated Dcode programs for handling such conditional breakpoints.

Next breakpoint pointer field 72 is also provided in breakpoint 64 to provide a link to the next breakpoint 64 in data structure 62. It should be appreciated that the last breakpoint will include a NULL pointer in field 72. Also, field 72 may be omitted if breakpoints are stored in other data structures.

Breakpoint 64 also includes a Dcode program label field 74 that identifies the entry point into the Dcode program for processing the breakpoint upon reaching the breakpoint during execution of a computer program. In the alternative, another identifier for the specific instruction in the Dcode program may be provided, e.g., the specific address or instruction number for the starting point in the Dcode program. In addition, it should be appreciated that a Dcode program may be limited to the function of processing a breakpoint (e.g., if setting and maintenance of breakpoints were performed through an alternate mechanism), and as such, Dcode program label 74 may not be required. It should further be appreciated that for unconditional breakpoints, Dcode program label 74 will typically be set to NULL.

It should be appreciated that other data structures may be utilized for each breakpoints 64, as well as for organizing multiple breakpoints 64 into a data structure 62, consistent with the invention.

Figure 5:
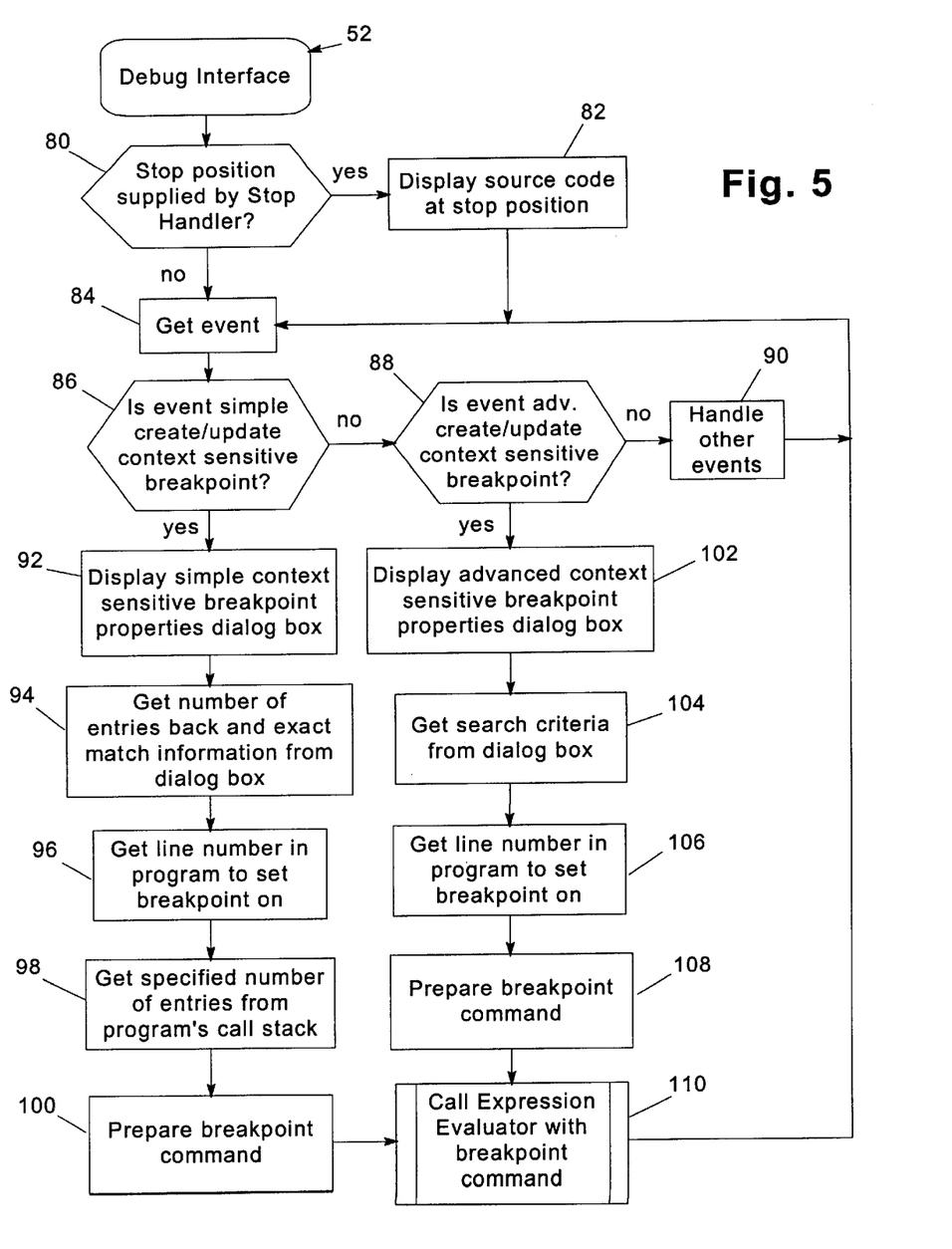
FIG. 5 is a flowchart illustrating the program flow of the debug interface module of FIG. 3.

The principal program flow of debug interface module 52 is illustrated in greater detail in FIG. 5. Upon invocation of module 52, block 80 is executed to determine whether a stop position was supplied by a stop handler (discussed below) upon invocation of module 52. If so, the source code of executable program 42 is displayed at that stop position for analysis by a programmer. Control then passes to block 84 to retrieve an event from the event manager for module 52. Returning to block 80, if no stop position was supplied by the stop handler, control is passed directly to block 84.

Block 84 initiates an event handling loop that processes events received by module 52, as is well known in the art of event management. Two events that are particularly relevant to the invention are detected and handled by blocks 86 and 88. Other events, which are not relevant to an understanding of the invention, are processed by block 90. Upon completion of the handling of any event, control is returned to block 84 to process additional events. As is well known in the art, a debug interface may receive any number of events unrelated to the invention, e.g., directed to displaying lines of source code, retrieving a program for debug, starting and stopping execution of a program, performing step and trace operations on a program, terminating the debugger, etc.

It should be appreciated that the configuration described in connection with FIG. 5 is an event-based processing system. In the alternative, other processing systems, e.g., procedural-based processing systems, may be used.

The specific implementation described herein utilizes two alternate manners of setting and maintaining context sensitive breakpoints consistent with the invention. A first manner, referred to herein as "simple" context sensitive breakpoint editing, limits the predetermined criteria for the calling stack to a comparison of a predetermined number of entries starting from the top of the calling stack. In addition, an option is provided to select whether or not an "exact" match is desired—that is, whether or not the statement or instruction from which a routine was called must also match the predetermined criteria. A second manner of maintaining a context sensitive breakpoint is referred to herein as "advanced" context sensitive breakpoint editing, which has greater flexibility in terms of the search parameters that a calling stack may meet to trigger a context sensitive breakpoint. As will be discussed in greater detail below, specific entries on the calling stack may be included or excluded from the predetermined search criteria, and each entry may be selectively limited to an exact statement. Moreover, specific entries may be "wild-carded" such that contents of such entries are ignored in the determination of the predetermined criteria. Moreover, sequences of entries may be separated by indeterminate numbers of entries so that the actual location of the sequence of entries in the calling stack is not considered.

"Simple" and "advanced" context sensitive breakpoint editing operations are respectively handled in blocks 86 and 88 of debug interface module 52. Each event may be generated in any number of manners known in the art, e.g., through a menu selection, a tool bar button, a dialog box, a keystroke combination, etc. Moreover, separate events may be utilized to handle creation of new breakpoints and updating of breakpoints. Additional events may also be supported, e.g., removing existing breakpoints.

Handling of a "simple" context sensitive breakpoint in response to an event to create and/or update the breakpoint is initiated by block 86 passing control to block 92, which displays the "simple" context sensitive breakpoint dialog box on the computer display. If the breakpoint exists and the event is an update operation, the existing parameters may be passed to the dialog box for display.

Figure 6:
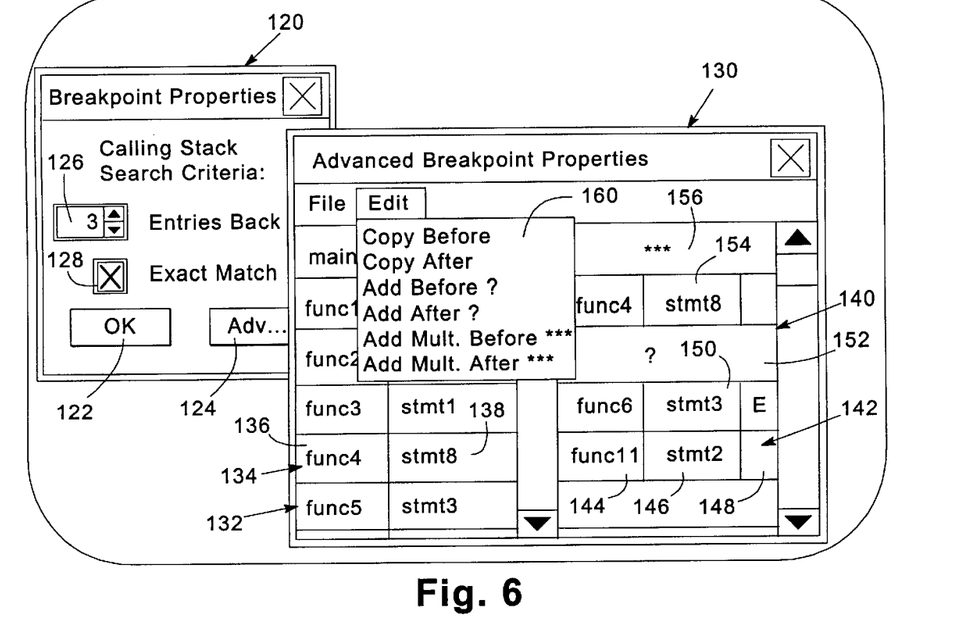
FIG. 6 is a block diagram of a computer display illustrating the simple and advanced dialog boxes of FIG. 3.

FIG. 6 illustrates one suitable implementation of a "simple" context sensitive breakpoint properties dialog box 120, which includes a plurality of user interface controls 122, 124, 126 and 128. User interface control 122 is an "OK" button that is used to confirm the settings specified for the context sensitive breakpoint. User interface 124 is an "Advanced" button that may be depressed by a user to select an "advanced" breakpoint properties dialog box 130. User interface 126 is utilized to permit the user to select the number of entries from the top of the stack to select for the search criteria for the context sensitive breakpoint. User interface 128, implemented herein as a checkbox or other suitable user interface control, determines whether or not the "exact" match option is selected for the predetermined criteria. It should be appreciated that any number of user interface controls may be utilized to enable a user to input suitable parameters for a context sensitive breakpoint consistent with the invention.

Returning to FIG. 5, control is typically returned to block 94 from the "simple" context sensitive breakpoint dialog box upon confirmation through selection of user interface control 122. In block 94, the number of entries back and the "exact" match information from the dialog box are retrieved. Next, block 96 obtains the line number in the program for which to set the breakpoint. Next, in block 98, the specified number of entries are retrieved from the program's call stack. To this extent, it should be appreciated that the creation or updating of a context sensitive breakpoint is typically performed when execution of the program is halted at a specific instruction or statement. In the alternative, the user may be permitted to either use the current state of the executable program when retrieving the line number and contents of the program's call stack in blocks 96 and 98, or to separately input such information in a manner that is independent of the current status of the execution of the program.

Once the desired information for the context sensitive breakpoint is retrieved, block 100 is executed to prepare a breakpoint command for processing by an expression evaluator in creating a Dcode program for the Dcode interpreter. Thus, program call 110 is performed to invoke the expression evaluator with the breakpoint command prepared in block 100. Processing then returns to block 84 to process additional events, and the breakpoint is set.

Returning to block 88, upon receipt of an event to create or update an "advanced" context sensitive breakpoint, control is passed to block 102 to display the "advanced" context sensitive breakpoint properties dialog box. If an existing breakpoint is being updated, the current properties therefor may also be passed to the dialog box for display to the programmer.

As shown, for example, in FIG. 6, a dialog box 130 may be utilized to perform detailed editing of the search criteria for a context sensitive breakpoint. Although any number of suitable interfaces may be utilized, one such interface utilizes a pair of columns, with the first column displaying the current contents of a calling stack at 132, with a plurality of entries 134 displayed in the order in which routine calls are added to the stack. Consistent with conventional debugger conventions, the calling stack is displayed in an inverted fashion, with the "top" of the stack displayed as the last entry. Each entry includes a routine identifier 136 that specifies the particular routine in which a routine call was made, as well as a statement identifier 138 that identifies the particular statement in that routine in which the routine call was made.

In a second column of dialog box 130, the current search criteria 140 is displayed, including, for example, a plurality of entries, 142 144, 146, 148 and 150. A number of possible entry types may be utilized, and selected in any number of manners, e.g., through an edit menu 160, among other possible user interface operations. As evidenced by entry 142, an entry may include a routine field 144, a statement field 146 and an "exact" match field or flag 148. The search criteria for entry 142 requires that the top entry on the calling stack specify a routine entitled "func11". Moreover, by virtue of the "exact" flag being clear, the statement from which the routine call was made is ignored in the criteria. Entry 142 may therefore be referred to as an "inexact" match entry. An "exact" match entry is illustrated at 150, where the predetermined criteria therefor requires that the second entry on the calling stack exactly match entry 150, with the calling routine being "func6" and the calling statement being "stmt3".

Another type of entry, represented by entry 152, is an "ignore" entry, represented by the "?" symbol, which specifies that the content of the entry should be ignored in the search criteria. Entry 154 is an inexact match entry similar to entry 142, and entry 156 represents yet another type of entry, an "indeterminate" entry, represented by the "*" symbol, that specifies that zero or more entries may follow entry 154** in the calling stack, and that any such entries should be ignored. Other indicators or symbols may be used to identify these types of entries in the alternative.

Thus, with the configuration displayed for dialog box 130 in FIG. 6, the predetermined criteria for the context sensitive breakpoint requires that top entry on the calling stack specify the routine labeled "func11", that the next entry specify an "exact" match with the calling routine being the routine entitled "func6" and the calling statement being "stmt3". The third entry on the calling stack is ignored, and the fourth entry on the stack must indicate a calling routine of "func4". The remainder of the calling stack is then ignored in the predetermined search criteria by virtue of indeterminate entry 156.

It should be appreciated that any number of user interface mechanisms may be utilized to edit the predetermined criteria 140, e.g., an edit menu 160 which provides an editing function utilizing two cursors that respectively point to specific entries in calling stack 132 and criteria 140. "Copy before" and "copy after" functions may be provided to copy the contents of the entry specified by the cursor on the calling stack to a position before or after the current cursor position in the search criteria. In addition, "add before ?" and "add after ?" functions may be supported to insert single "ignore" entries either before or after the current position of the cursor in the search criteria. In addition, additional functions "add multiple before *" and "add multiple after *" may be supported to insert an indeterminate entry before or after the current position of the cursor in the search criteria so that the relative location of any entry below the indeterminate entry is not considered in the predetermined criteria—only that such entries exist someplace in the calling stack. It should also be appreciated that direct editing of any entry may be permitted, e.g., through selecting any function, statement, or "exact" match flag in an entry. Removal and movement of entries in the search criteria, among other editing functions, may also be supported.

As another alternative, wildcards may be utilized in the routine field and/or the statement field so that a subset of routines and/or statements may be identified by an entry. One beneficial use of wildcards in this manner would be when routine names follow a naming convention that requires routine names to identify certain relevant information such as a particular program that the routine is part of, and/or a particular programmer or group of programmers that wrote the routine, among others; whereby a search criteria may be based in part on the presence or absence of any of the routines from certain programs, written by certain programmers, etc.

It should further be appreciated that any number of alternative manners of inputting a search criteria may be used in the alternative. For example, a user may be permitted to input a Boolean search term, or in other manners known in the art.

Returning to FIG. 5, once the "advanced" context sensitive breakpoint properties dialog box has been displayed in block 102, a user will close the dialog box (e.g., through selecting a "exit" menu selection), whereby control will be returned to block 104 to retrieve the search criteria from the dialog box. Next, block 106 retrieves the line number in the program for which a breakpoint should be set. Next, block 108 prepares the breakpoint command, and a function call is then made in block 110 to call the expression evaluator for processing the breakpoint command. Processing of the event is then complete, and control returns to block 84 to process additional events.

Preparation of a breakpoint command in blocks 100 and 108 of FIG. 5 may result in any number of formats of breakpoint commands. Typically, the format of the command will depend upon the configuration of the expression evaluator module 58 that processes such a command. For example, one suitable breakpoint command may take the format of:

BREAK{line number}STACK({search criteria}), where "{line number}" specifies the line number in the source code for the executable program for the instruction at which to set a breakpoint, and where "{search criteria}" is the specific search criteria upon which to condition the breakpoint.

The search criteria may provide any suitable expression upon which triggering of the breakpoint may be conditioned. For example, the search criteria may specify a boolean expression, or may simply list the required contents of the calling stack. One suitable search criteria, for example, may list each entry in the search criteria:

({entry1} {entry2} . . . {entryN}), where each entry can be one of several types identified in Table I below:

TABLE I

Search Criteria Entry Types

| Entry Type | Format | Alternate Representation |
|---|---|---|
| Inexact Match | "routineName" | "[routineName]" |
| Exact Match | "[routineName]" | "[routineName,statementID]" |
| Ignore | "?" | |
| Indeterminate | "***" | |

Thus, assuming for example that the current contents of the calling stack are as illustrated in FIG. 6, and that the line number of the statement at which the breakpoint is to be set is "25", the search criteria for the simple context sensitive breakpoint specified in dialog box 120 would generate a breakpoint command with the format:

BREAK 25 STACK ([func5][func4][func3]), or, using the alternative representation (which includes a statement identifier, e.g., the address of the statement, for an exact match type entry):

BREAK 25 STACK ([func5, stmt3][func4, stmt8][func3, stmt1]).

Similarly, assuming the same line number and current contents of the calling stack, the search criteria for the advanced context sensitive breakpoint specified in dialog box 130 would generate a breakpoint command with the format:

BREAK 25 STACK (func11[func6]?func4***), or, using the alternative representation:

BREAK 25 STACK ([func11][func6, stmt3]?[func4]***).

It should be appreciated that other breakpoint command formats may be used in the alternative. Moreover, separate commands may be used to perform breakpoint update and breakpoint create operations in other embodiments. Other commands, e.g., to remove breakpoints, may also be supported.

Figure 7:
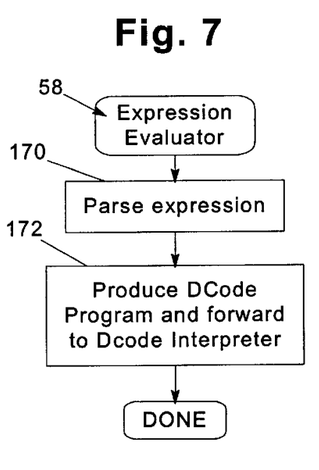
FIG. 7 is a flowchart illustrating the program flow of the expression evaluator module of FIG. 3.

FIG. 7 illustrates in greater detail the program flow of expression evaluator module 58. Expression evaluator 58 is typically a full language expression evaluator, e.g., in a programming language such as C. The expression evaluator therefor proceeds, upon receipt of an expression from the debug interface, by parsing the expression in block 170, and producing a Dcode program in block 172 and forwarding such a program to a Dcode interpreter module 60. Each of these processes is well understood in the debugging art.

Support for a breakpoint command is merely an extension of the language for the expression evaluator, with the breakpoint command considered as a debugger directive. The output of the expression evaluator, the Dcode program, is typically in assembly-type language format that is executable by a Dcode interpreter in a manner well known in the art.

As an example, one Dcode program that implements the simple context sensitive breakpoint described above may take the form illustrated in Table II below:

TABLE II

| | | Example Decode Program |
|---|---|---|
| 1 | SET: | BGN |
| 2 | | LDL TEST |
| 3 | | LDC 25 |
| 4 | | ST_BRK |
| 5 | | END |
| 6 | TEST: | BGN |
| 7 | | LDC"[func5] [func4] [func3]" |
| 8 | | TST_STK |
| 9 | | END Boolean |

Here, the Dcode program includes two portions, the start of each being respectively identified by the labels "SET" and "TEST" at lines 1 and 6. The "SET" portion of the Dcode program (lines 1–5), performs a breakpoint set operation, and the "TEST" portion of the Dcode program (lines 6–9) performs a breakpoint test operation, both of which are handled in a manner discussed in greater detail below with respect to Dcode interpreter module 60.

It should be appreciated that the extension of the language of an expression evaluator to accommodate a breakpoint command is well within the capabilities of one of ordinary skill in the art. Moreover, the specific syntax of the command will vary depending upon the language used, as well as the particular breakpoint maintenance operations desired (e.g., creating, updating, removing, etc.). Furthermore, a Dcode program may also support other conditional breakpoints in a manner known in the art.

Figure 8:
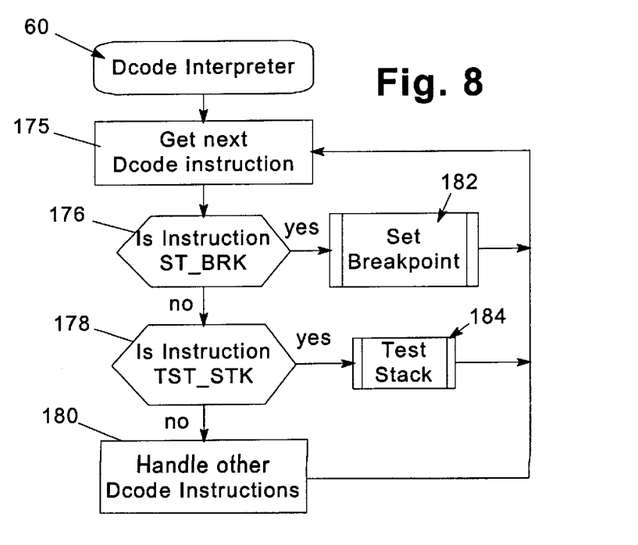
FIG. 8 is a flowchart illustrating the program flow of the Dcode interpreter module of FIG. 3.

The program flow of Dcode interpreter module 60 is illustrated in greater detail in FIG. 8. Module 60 generally operates upon invocation by processing each Dcode instruction in a Dcode program passed thereto. The module waits in block 175 for a next Dcode instruction to be passed thereto. Upon receipt of such an instruction, control passes to block 176 to determine whether the instruction is a set breakpoint instruction "ST_BRK". If not, control passes to block 178 to determine whether the instruction is a test breakpoint instruction "TST_STK". If not, control passes to block 180 to handle the Dcode instruction in a manner known in the art. Control then returns to block 175 to process a next Dcode instruction. It should be appreciated that a multitude of Dcode instructions are conventionally handled in block 180 in a manner that is well known in the art.

The "ST_BRK" and "TST_STK" instructions are specific to the implementation of context sensitive breakpoints. In response to a "ST_BRK" instruction, a set breakpoint routine 182 is called. In response to a "TST_STK" instruction, a test stack routine 184 is called. Upon completion of either routine, control returns to block 175 to process additional Dcode instructions.

Continuing with the example Dcode program set forth above in Table II, upon passage of the Dcode program generated by expression evaluator module 58, the instruction stored at line 2 of the program, "LDL TEST" will be processed to push onto the top of the Dcode interpreter stack an identifier for the "TEST" label that points to the beginning of the Dcode program routine for handling the testing of a break context-sensitive breakpoint. Next, the instruction at line 3 of the Dcode program, "LDC 25", will be processed to push onto the top of the Dcode interpreter stack the line number at which to set the breakpoint. Next, the instruction at line 4 of the Dcode program, "ST_BRK" will be executed, and the set breakpoint routine 182 will be called by the Dcode interpreter module. Upon completion of this routine, an "END" instruction is processed by the Dcode interpreter, whereby processing of the Dcode program is complete.

Figure 9:
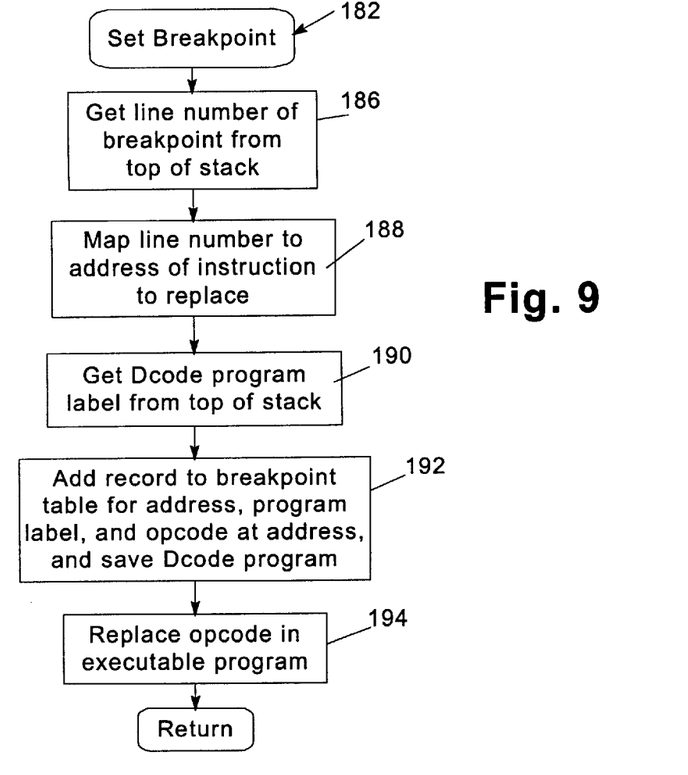
FIG. 9 is a flowchart illustrating the program flow of the set breakpoint routine called by the Dcode interpreter module of FIG. 8.

FIG. 9 illustrates set breakpoint routine 182 in greater detail. As discussed above with respect to Table II, the result of a set breakpoint routine in a Dcode program, the label for the test breakpoint routine in the Dcode program is pushed onto the Dcode interpreter stack, followed by the line number at which to set the breakpoint. As a result, the top of the stack upon calling the set breakpoint routine includes the line number at which to set the breakpoint. Accordingly, block 186 is called to pop the line number of the breakpoint from the top of the stack. Next, in block 188, the line number is mapped to the address of the instruction to be replaced in the executable program, in a manner well known in the art.

Next, in block 190, the Dcode program label is popped from the top of the stack, and in block 192, a breakpoint record (e.g., of the format of record 64 of FIG. 4), is added to the breakpoint table 62, including the address of the instruction to replace, the opcode currently stored at that address, a pointer to the Dcode program, and the program label that specifies the beginning of the test breakpoint routine in the Dcode program. In addition, in block 192, the Dcode program is saved in the Dcode interpreter module for future execution.

Next, once a record has been added to the breakpoint table, control passes to block 194 to replace the opcode in the executable program with a suitable breakpoint opcode that will trigger an exception during execution of the program, and consequently, handling of the breakpoint in the manner described herein.

Continuing with the above example, execution of the Dcode program of Table II results in a new breakpoint being added to the breakpoint table, with the breakpoint including an address corresponding to line 25 of the source code, a pointer to the Dcode program of Table II, the current opcode stored at line 25 of the source code, and the "TEST" label that specifies the start of the test breakpoint routine in the Dcode program.

It should be appreciated that, for performing operations such as updating or removing existing breakpoints, additional breakpoint routines may be utilized consistent with the invention. Implementation of such routines would be well within the ability of one of ordinary skill in the art.

Processing of Context Sensitive Breakpoints

Figure 10:
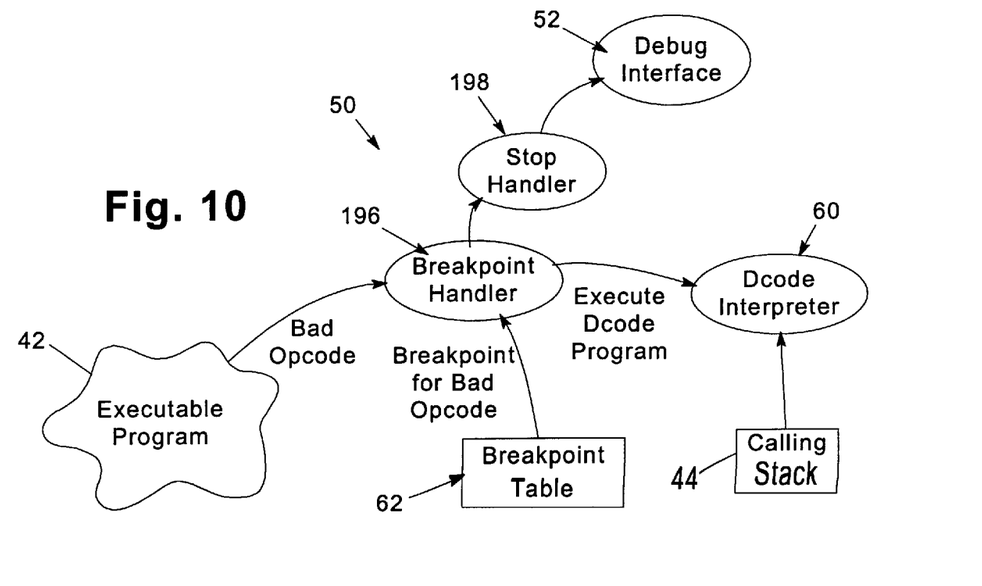
FIG. 10 is a block diagram of various debugger modules utilized by the debugger computer program of FIG. 2 in handling a context sensitive breakpoint consistent with the invention.

FIG. 10 illustrates the software modules of debugger 50 that relate to the processing of context sensitive breakpoints consistent with the invention. Generally, in response to processing of a bad opcode in executable program 42, a breakpoint handler module 196 is invoked to handle the breakpoint. Module 196 receives from breakpoint table 62 the breakpoint that corresponds to the bad opcode received from program 42. In turn, breakpoint handler module 196 starts execution of the Dcode program at the test breakpoint routine thereof in Dcode interpreter 60. Then, should it be determined that the breakpoint is triggered, breakpoint handler module 196 calls a stop handler module 198, which in turn halts execution of the executable program and causes debug interface module 52 to display the source code at such a point. Upon restarting executable program 42, breakpoint handler 196 will also insure that the original opcode is executed in place of the bad opcode inserted for the purpose of breakpoint detection.

Figures 11, 12, 13:
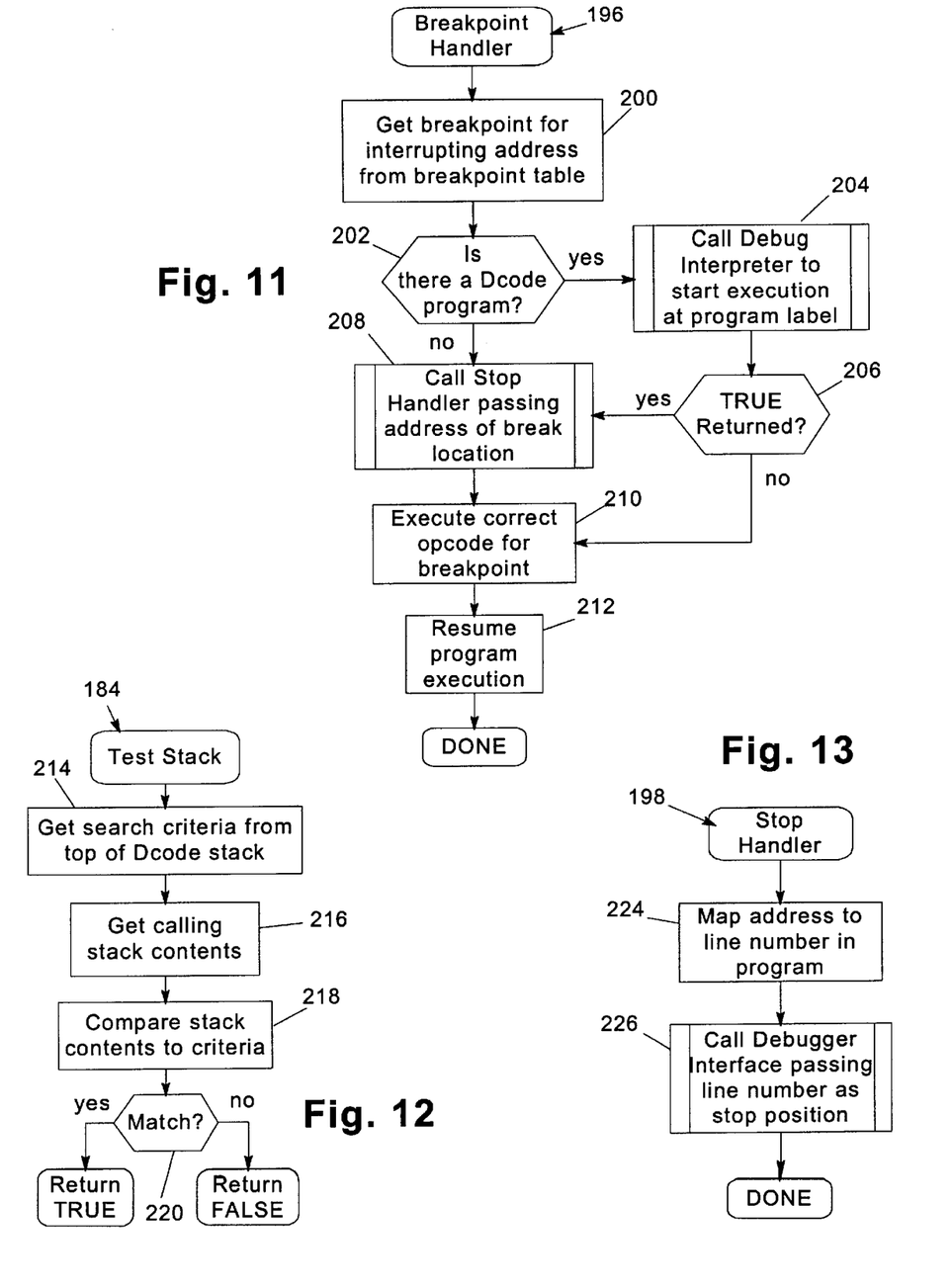
FIG. 11 is a flowchart illustrating the program flow of the breakpoint handler module of FIG. 10.
FIG. 12 is a flowchart illustrating the program flow of the test stack routine called by the Dcode interpreter module of FIG. 8.
FIG. 13 is a flowchart illustrating the program flow of the stop handler module of FIG. 10.

FIG. 11 illustrates the program flow of breakpoint handler module 196 in greater detail. Module 196 is invoked in response to a bad opcode being reached during execution of executable program 42, which generates an interrupt that is handled by the breakpoint handler. As such, module 196 begins in block 200 by accessing the breakpoint table 62 to locate the breakpoint record 64 corresponding to the interrupting address. Once this record is located, block 202 determines whether a Dcode program exists, typically by accessing the pointer to the Dcode program at 70 (FIG. 4) and determining whether the pointer is set to NULL (indicating that no such program exists).

If a Dcode program does exist, control passes to block 204 to call the debug interpreter to start execution of the Dcode program at the program label specified at 74 breakpoint record 64 (FIG. 4). The program then executes in the debug interpreter until complete, whereby a TRUE or FALSE result is returned, with TRUE result indicating that the search criteria for the breakpoint has been met by the current condition of the calling stack.

As a result, if a TRUE result is returned, block 206 passes control to block 208 to call the stop handler, passing the address of the break location thereto. Control then passes to block 210 to execute the correct opcode stored in the breakpoint record 64 for the breakpoint once execution of the program is restarted.

Returning to block 206, if a FALSE result is returned from the debug interpreter, control passes directly to block 210, bypassing the stop handler. In addition, returning to block 202, if no Dcode program is associated with the breakpoint, control passes directly to block 208 to unconditionally pass control to the stop handler and halt execution of the program.

Once the correct opcode for the breakpoint has been executed, control passes to block 212 to resume program execution, in a manner well known in the art. Breakpoint handler module 196 is then complete.

As discussed above, the debug interpreter is called to execute the test breakpoint routine of the Dcode program. For example, with the Dcode program of Table II, this would result in the Dcode interpreter first pushing onto the stack the search criteria, in this case the string "[func5][func4][func3]" by virtue of the "LDC" instruction at line 7 of the example Dcode program. Next, the Dcode interpreter encounters the "TST_STK" instruction at line 8 of the example Dcode program, which is processed by test stack routine 184, shown in greater detail in FIG. 12.

Routine 184 begins at block 214 by popping the search criteria off the top of the Dcode stack. Next, in block 216, the current contents of the calling stack are retrieved, and in block 218, the stack contents are compared to the search criteria. If a match exists, block 220 returns a TRUE result, and if not, block 220 returns a FALSE result. In either event, routine 194 is complete, and the result is passed back to the breakpoint handler module 196 upon completion of processing of the Dcode program by module 60.

FIG. 13 illustrates stop handler module 198 in greater detail. As discussed above with respect to module 196, whenever the stop handler is called, the address of the break location is passed thereto. As a result, module 198 begins in block 224 by mapping the address passed by the breakpoint handler to a specific line number of the source code for the executable program. Other manners of identifying a stop position may be used, e.g., passing the address to the debugger interface module, or providing a statement or instruction number for a compiled version of the program, among others. Next, stop handler 198 calls the debugger interface module 52, passing the line number as a stop position. Module 198 is then complete.

Returning briefly to FIG. 5, it is noted that when debug interface module 52 is invoked, the stop position supplied by the stop handler is tested for in block 80, and if such a stop position has been supplied, control is passed to block 82 to display the source code at the stop position. As a result, when a context sensitive breakpoint is reached and the calling stack meets the search criteria, execution of the program is halted and the appropriate source code is displayed by the debug interface module for analysis by a computer programmer.

Various modifications may be made to the exemplary embodiments without departing from the spirit and scope of the invention. For example, in some debugger implementations, an executable program is loaded into working storage prior to the debug interface and inserting a breakpoint therein. Accordingly, this functionality may be incorporated into debugger 50 consistent with the invention. Also, it should be appreciated that any known manner of implementing a search expression for comparing the calling history, or context of an executable program during execution, may be used in the alternative.

Additional modifications may be made without departing from the spirit and scope of the invention. Therefore, the invention is defined in the claims hereinafter appended.

What is claimed is:

1. A method of debugging a computer program, comprising:

(a) processing a sequence of instructions from the computer program;

(b) detecting a context sensitive breakpoint associated with a predetermined instruction in the sequence of instructions;

(c) upon detecting the context sensitive breakpoint, determining whether a calling history for the computer program meets a predetermined criteria associated with the context sensitive breakpoint; and (d) interrupting processing of the sequence of instructions if the calling history for the computer program meets the predetermined criteria.

2. The method of claim 1, further comprising setting the context sensitive breakpoint.

3. The method of claim 2, wherein setting the context sensitive breakpoint includes replacing the predetermined instruction with an invalid instruction to trigger detection of the context sensitive breakpoint.

4. The method of claim 3, further comprising simulating the predetermined instruction upon restarting processing of the sequence of instructions.

5. The method of claim 2, wherein the predetermined criteria identifies at least one calling routine in the computer program, and wherein determining whether a calling history for the computer program meets the predetermined criteria includes determining whether the at least one calling routine is located in an entry in a calling stack associated with the computer program.

6. The method of claim 5, wherein the predetermined criteria further identifies a predetermined instruction associated with the calling routine, and wherein determining whether the calling history for the computer program meets the predetermined criteria further includes determining, if the at least one calling routine is located in an entry in the calling stack, whether the predetermined instruction associated with the calling routine is also located in the entry.

7. The method of claim 5, wherein the predetermined criteria further identifies a predetermined location in the calling stack for the calling routine, and wherein determining whether the calling history for the computer program meets the predetermined criteria further includes determining, if the at least one calling routine is located in an entry in the calling stack, whether the entry within which the calling routine is located is located at the predetermined location in the calling stack.

8. The method of claim 5, wherein the predetermined criteria includes a plurality of entries, each entry in the predetermined criteria selected from the group consisting of an inexact match entry, an exact match entry, an ignore entry, and an indeterminate entry.

9. The method of claim 5, wherein setting the breakpoint includes storing the contents of a predetermined number of entries from the top of the calling stack as the predetermined criteria.

10. The method of claim 2, wherein setting the context sensitive breakpoint includes:

(a) generating a breakpoint command that specifies the predetermined criteria; and (b) generating from the breakpoint command an breakpoint program for execution by an interpreter.

11. The method of claim 10, wherein the breakpoint program is associated with a test routine, wherein setting the context sensitive breakpoint includes creating a breakpoint record in a breakpoint data structure, the breakpoint record defining the predetermined instruction, the predetermined criteria, and the breakpoint program associated with the context sensitive breakpoint, and wherein determining whether the calling history for the computer program meets the predetermined criteria includes:

(a) locating the breakpoint record in the breakpoint data structure; and (b) executing the test routine to determine whether the calling history for the computer program meets the predetermined criteria.

12. The method of claim 11, wherein the breakpoint program is also associated with a set routine, wherein setting the context sensitive breakpoint further includes executing the set routine to create the breakpoint record in the breakpoint data structure.

13. An apparatus, comprising:

(a) a memory;

(b) a first program resident in the memory, the first program having associated therewith a calling history; and (c) a second program resident in the memory and configured to interrupt processing of a sequence of instructions from the first program in response to detection of a context sensitive breakpoint associated with a predetermined instruction in the sequence of instructions if the calling history for the first program meets a predetermined criteria associated with the context sensitive breakpoint.

14. The apparatus of claim 13, wherein the second program is further configured to set the context sensitive breakpoint.

15. The apparatus of claim 14, wherein the second program is further configured to replace the predetermined instruction with an invalid instruction when setting the context sensitive breakpoint to trigger detection of the context sensitive breakpoint, and to simulate the predetermined instruction upon restarting of the processing of the sequence of instructions.

16. The apparatus of claim 14, further comprising a calling stack associated with the first program and defining the calling history thereof, the calling stack including at least one entry identifying a calling routine in the first program, and wherein the predetermined criteria identifies at least one calling routine in the first program.

17. The apparatus of claim 16, wherein the predetermined criteria further identifies a predetermined instruction associated with the calling routine.

18. The apparatus of claim 16, wherein the predetermined criteria further identifies a predetermined location in the calling stack for the calling routine.

19. The apparatus of claim 16, wherein the predetermined criteria includes a plurality of entries, each entry in the predetermined criteria selected from the group consisting of an inexact match entry, an exact match entry, an ignore entry, and an indeterminate entry.

20. The apparatus of claim 15, wherein the second program further comprises an interpreter configured to execute a breakpoint program associated with the context sensitive breakpoint.

21. The apparatus of claim 20, wherein the breakpoint program is associated with a test routine used in the determination of whether the calling history for the first program meets the predetermined criteria, the apparatus further comprising a breakpoint data structure including a breakpoint record associated with the context sensitive breakpoint, the breakpoint record identifying the predetermined instruction, the predetermined criteria, and the breakpoint program associated with the context sensitive breakpoint, and wherein the interpreter is configured to execute the test routine to determine whether the calling history for the first program meets the predetermined criteria.

22. The apparatus of claim 21, wherein the breakpoint program is also associated with a set routine, and wherein the second program is configured to execute the set routine to create the breakpoint record in the breakpoint data structure.

23. The apparatus of claim 13, wherein the second program is a debugger program.

24. A program product for use in debugging a first program, the program product comprising:
(a) a second program configured to interrupt processing of a sequence of instructions from the first program in response to detection of a context sensitive breakpoint associated with a predetermined instruction in the sequence of instructions if a calling history associated with the first program meets a predetermined criteria associated with the context sensitive breakpoint; and
(b) a signal bearing media bearing the second program.

25. The program product of claim 24, wherein the signal bearing media is transmission type media.

26. The program product of claim 24, wherein the signal bearing media is recordable media.

27. The program product of claim 24, wherein the second program is a debugger program.

* * * * *